United States Patent

Greenbaum

[11] Patent Number: 5,483,825
[45] Date of Patent: Jan. 16, 1996

[54] ACCELERATOR PEDAL SYSTEM PERFORMANCE MEASUREMENT APPARATUS

[75] Inventor: Joseph J. Greenbaum, Bloomfield Hills, Mich.

[73] Assignee: Ford Motor Company, Dearborn, Mich.

[21] Appl. No.: 316,757

[22] Filed: Oct. 3, 1994

[51] Int. Cl.$^6$ .................................................. G01N 19/00
[52] U.S. Cl. .................................................. 73/132
[58] Field of Search .................. 73/117, 132, 865.9, 73/865.6, 866.4

[56] References Cited

U.S. PATENT DOCUMENTS

| | | | |
|---|---|---|---|
| 3,465,577 | 9/1969 | Donovan | 73/117 |
| 3,713,332 | 1/1973 | Herrbrich | 73/117 |
| 5,172,589 | 12/1992 | Witt | 73/132 |
| 5,394,743 | 3/1995 | Noguchi et al. | 73/117 |

*Primary Examiner*—Robert Raevis
*Attorney, Agent, or Firm*—Kevin G. Mierzwa; Roger L. May

[57] ABSTRACT

An apparatus for measuring the performance of an accelerator pedal of an automotive vehicle includes a torso member which is seated in a driving position of an automobile. The torso member has a leg mechanism connected thereto for actuating an accelerator pedal. The torso member has a hip portion which rotates about an axis which remains fixed relative to the seat despite the position of the leg. Various transducers are strategically located to measure certain performance characteristics of the accelerator pedal such as the force for operating the pedal, the angle of the foot while operating the pedal, and pedal scrub. Because the lengths of the members and the angles of the joints are measured, the movement of each portion of the apparatus are related to movement relative to the axis.

19 Claims, 3 Drawing Sheets

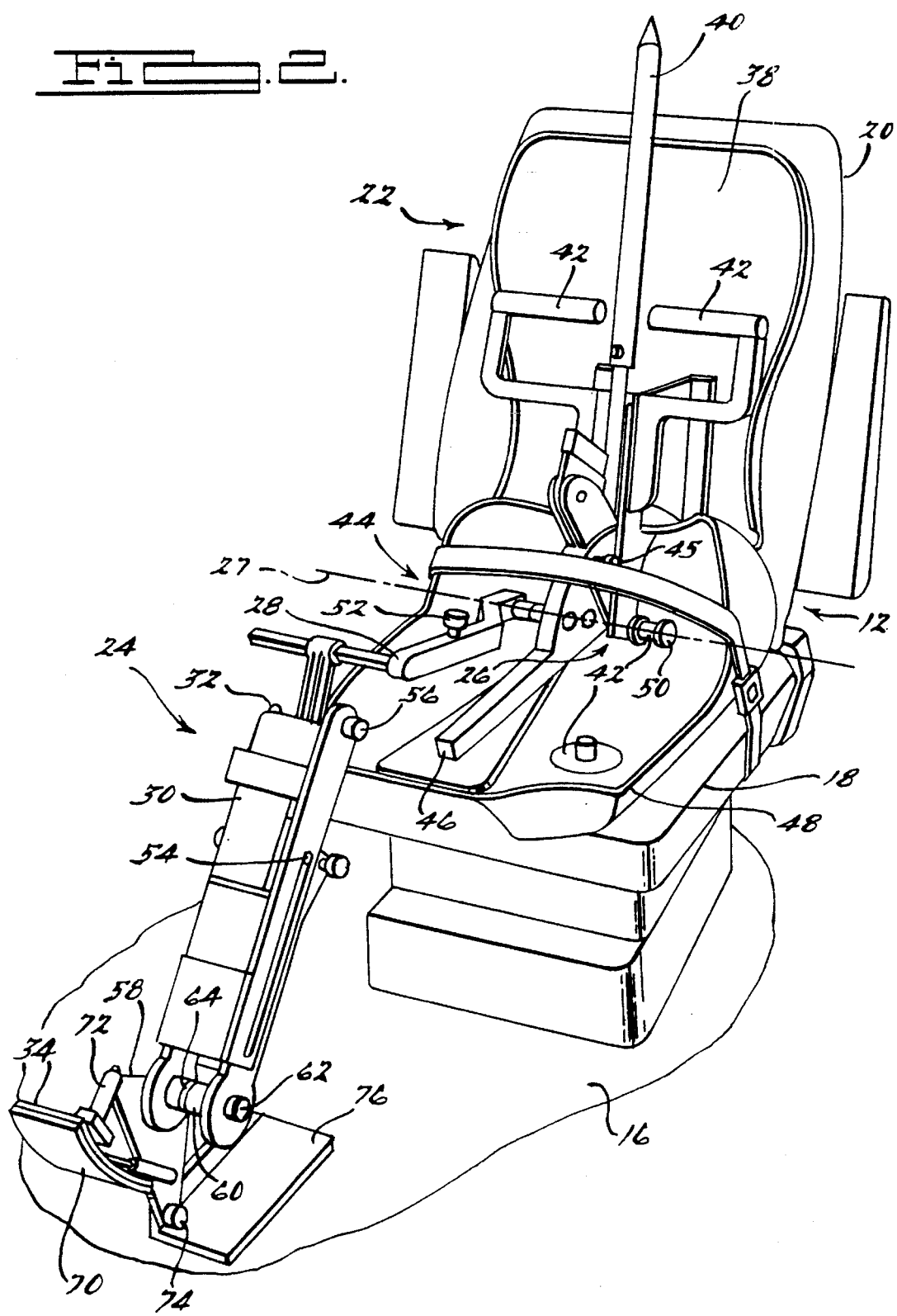

ACCELERATOR PEDAL SYSTEM PERFORMANCE MEASUREMENT APPARATUS

BACKGROUND OF THE INVENTION

The present invention relates to an apparatus for measuring the performance of an accelerator pedal of an apparatus for automotive vehicle.

The accelerator pedal is a main control used by the operator of a motor vehicle. Because of the frequent use of the accelerator pedal, performance of the accelerator pedal significantly influences the operator's perception of vehicle performance. Quantifying accelerator pedal performance and translating the measured performance into engineering data factors is useful information to consider in the design process.

Some important characteristics of accelerator performance are pedal scrub, the angle the foot engages the accelerator pedal and the force for operating the pedal. Pedal scrub is the amount the foot moves with respect to the surface of the accelerator pedal while depressing the accelerator pedal. The accelerator pedal typically moves in an arc centered above the accelerator pedal above the lower portion of the instrument panel. The heel of the foot, on the other hand, moves in an arc centered around a point on the floor. A disparity arises between the two arcs when the pedal is depressed. Pedal scrub is the disparity measured as a linear distance between the arcs. A driver typically compensates for pedal scrub by moving the foot to maintain a constant position on the accelerator pedal. No movement of the foot is optimal in terms of customer perception. However, since eliminating pedal scrub is nearly impossible to achieve, the preference is to minimize pedal scrub.

Because performance characteristics of the accelerator pedal are important, providing an apparatus to accurately test accelerator pedal performance is crucial. In previously known measurement techniques several measurement devices were used to obtain data in a piecemeal manner. One problem with such data is that the measurements are not related to each other or to the position of a driver in the driver's seat. Consequently, the data obtained in such a manner was typically not repeatable.

SUMMARY OF THE INVENTION

One desirable feature of the present invention is that the accelerator pedal performance characteristics are measured with respect to a common reference point and under conditions corresponding to a driving position. Consequently, one advantage of the present invention is decreased measurement variation and reduced test time.

According to the present invention the apparatus includes a torso member which is seated in a driving position of an automobile. The torso member has a leg mechanism connected thereto for actuating an accelerator pedal. The torso member has a hip portion which rotates about an axis which remains fixed relative to the seat despite the position of the leg. Various transducers are strategically located to measure certain performance characteristics of the accelerator pedal such as the force for operating the pedal, the angle of the foot while operating the pedal, and pedal scrub. Because the lengths of the members and the angles of the joints are measured, the movement of each portion of the apparatus are related to movement relative to the axis.

BRIEF DESCRIPTION OF THE DRAWINGS

FIG. 2 is a perspective view of a preferred embodiment of the present invention.

FIG. 3 is a side view of the leg mechanism according to the present invention.

DETAILED DESCRIPTION OF THE PREFERRED EMBODIMENT

Figure 1:
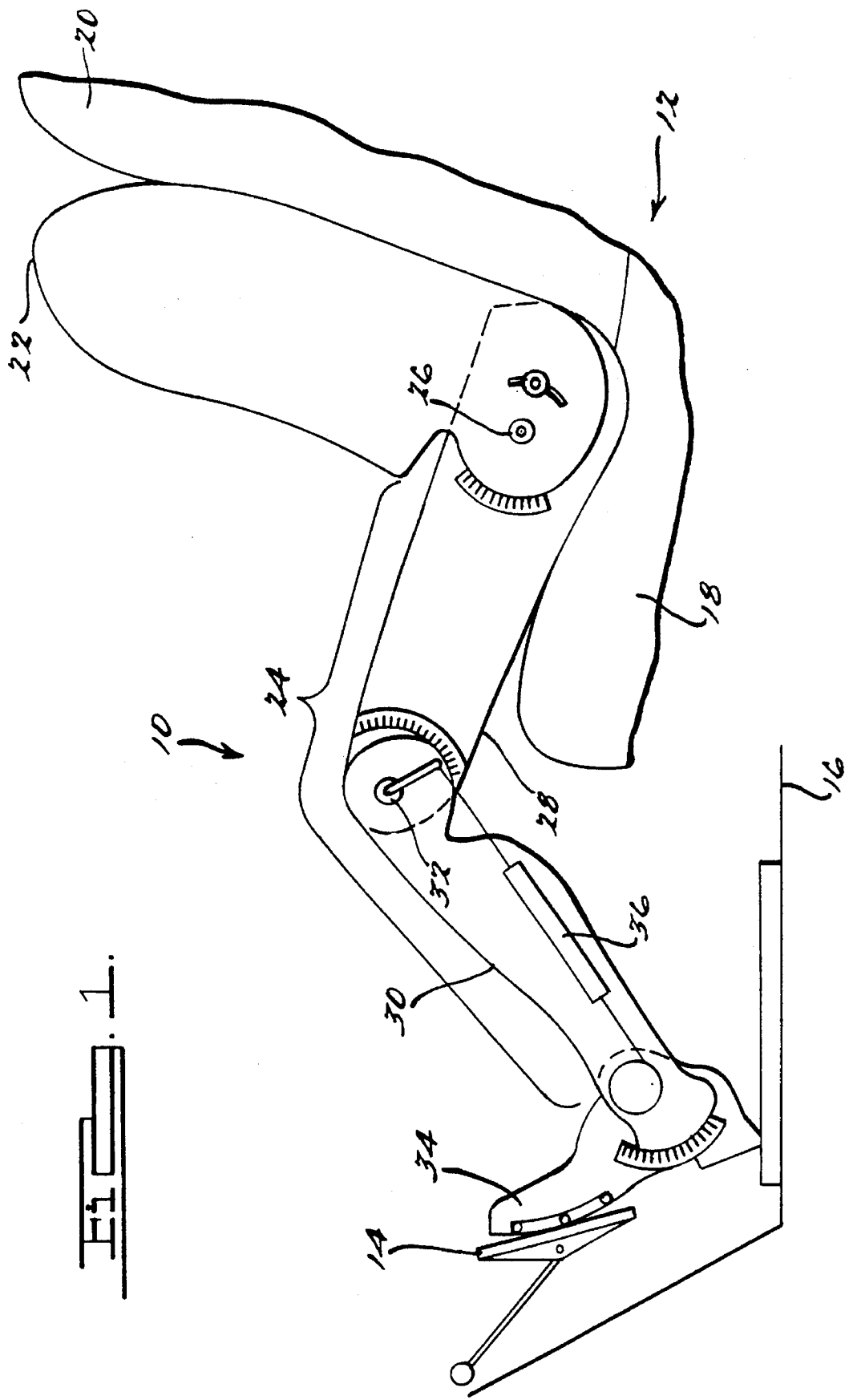
FIG. 1 is a diagrammatical representation of an apparatus of the present invention in its operating environment.
Figure 7:
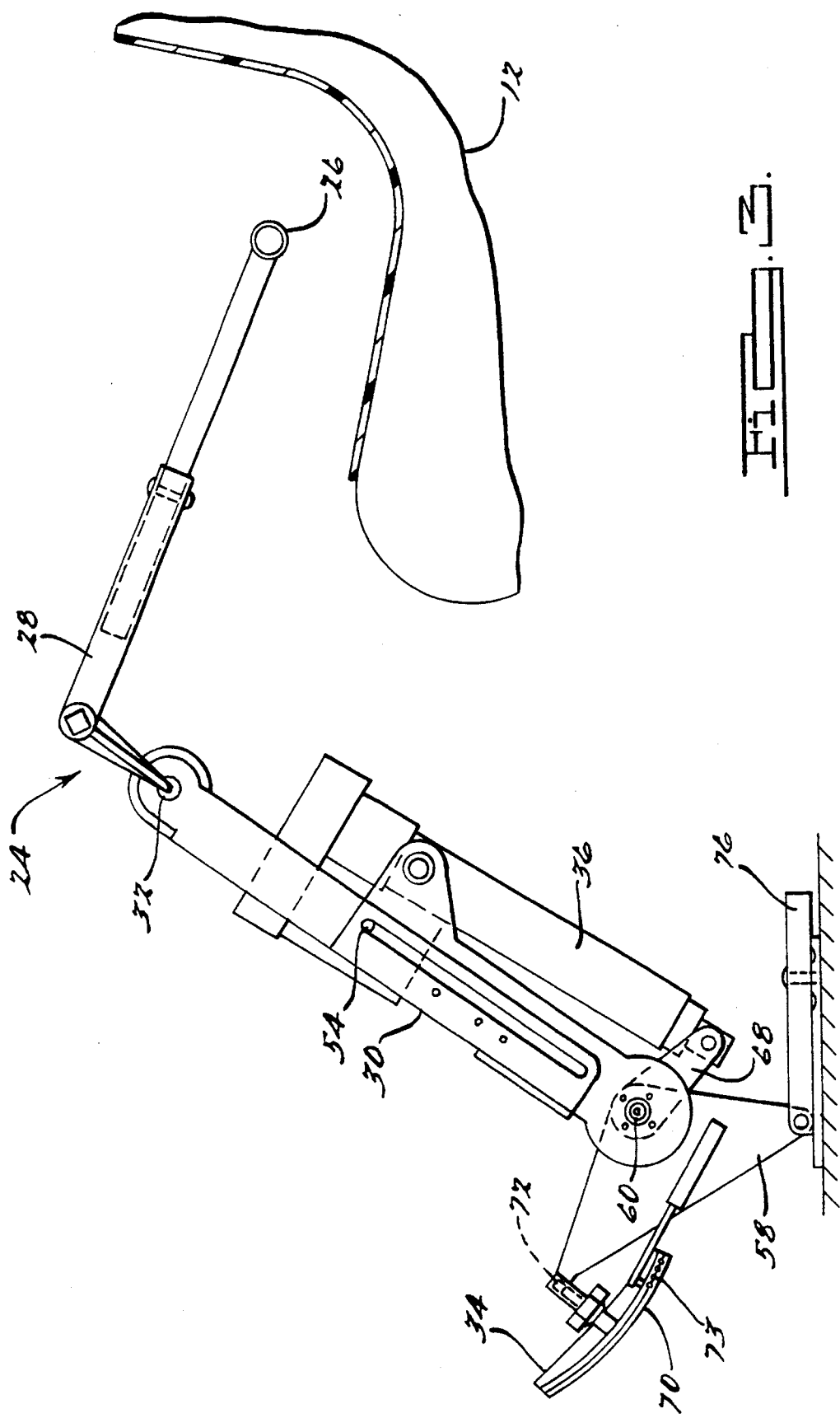

Referring first to FIG. 1 a test fixture 10 is placed on a seat 12 and has a fixed relation to an accelerator pedal 14 and the floor 16 of an automobile. Seat 12 has a seat base 18 and a seat back 20. Seat 12 can also have a seat belt 21 that as shown as a lap belt but can further include a shoulder belt. Seat belt 21 is useful in securing test fixture 10 in seat 12.

Referring now to FIGS. 1 and 2, test fixture 10 has a torso mechanism 22 connected to leg mechanism 24 at a hip joint 26. Hip joint 26 pivots about a reference axis 27 disposed laterally to both the torso mechanism 22 and leg mechanism 24. Reference axis 27 is the axis around which the hip joint 26 pivots. One important characteristic of hip joint 26 and reference axis 27 is that they remain fixed relative to both seat base 18 and seat back 20 despite the position of leg mechanism 24. The location of the hip joint 26 on reference axis 27 is called the "H-point."

Leg mechanism 24 generally comprises a femur member 28 connected to hip joint 26, a calf member 30 connected to the femur member 28 by a pivoting knee joint 32, and a foot member 34. A linear actuator 36 controls the movement of leg mechanism 24.

Torso mechanism 22 has a back plate 38 and a torso support 40. Torso mechanism 22 has a back plate 38 fixed in relation to torso support 40. Torso support 40 supports back plate 38 against seat back 20. Back plate 38 has a width approximating the average width of a human.

A seat mechanism 44 supports torso mechanism 22. Seat mechanism 44 has a seat base support 46 and a seat base plate 48. Seat base support 46 pivotally connects to torso support 40 at hip joint 26. Movement of seat base support 46 with respect to torso support 40 allows test fixture 10 to be placed in a seat 12 while allowing for variation in different seats. The position of torso support 40 is fixed into place with respect to seat base support 46 while testing by a set screw 45 or other suitable fastener. Both back plate 38 and seat base plate 48 are plastic or other appropriate material and are of suitable width to support test fixture 10 in an upright position in seat 12.

Hip joint 26, seat base plate 48 and torso support 40 each have weight hangers 42 for mounting weights to simulate the weight distribution of a human on seat 12.

Referring now to FIGS. 2 and 3, femur member 28 is preferably formed from two pieces that are slidably engaged. A set screw 52 securely fastens the two pieces together during testing. The length of femur member 28 is adjustable to simplify testing accelerator pedal performance for different size occupants.

Hip joint 26 preferably has a rotary hip transducer 50 that provides an analog output based on the angle between femur member 28 and torso support 40. Hip transducer 50 is preferably of the rotary potentiometer type having a range between 0° and 90° having an accuracy of about ±1°. One example of such a potentiometer is the 6180 series produced by Beckman Industrial, Corp of Fullerton, Calif.

Calf member 30 is also preferably formed of two slidably engaged pieces. A set screw 54 or other easily adjustable securing means securely fastens the two pieces during testing.

Calf member 30 and femur member 28 connect at knee joint 32. Knee joint 32 preferably pivots about an axis parallel to reference axis 27. Knee joint 32 preferably has a knee transducer 56 connected thereto to provide an analog output based on the angle between femur member 28 and calf member 30. Knee transducer 56 is preferably of the same type as hip transducer 50.

An ankle joint 60 pivotally connects calf member 30 to one vertex of a triangular linkage 58. Ankle joint 60 preferably pivots about an axis parallel to reference axis 27. The shape of triangular linkage is described as a triangle for convenience; however, the linkage may be a variety of shapes without varying the scope of the invention.

Ankle joint 60 has an ankle torque transducer 62 and an ankle angle transducer 64 connected thereto. Ankle torque transducer 62 provides an analog output based on the torque between ankle joint 60 and calf member 30. Ankle angle transducer 64 provides an analog output based on the angle between triangular linkage 58 and calf member 30.

Leg mechanism 24 moves using linear actuator 36 connected between triangular linkage 58 and calf member 30. Actuator 36 fixedly attaches to triangular linkage 58 at or near ankle joint by way of a lever 68.

Linear actuator 36 is preferably a 12 Volt DC operated actuator since automotive vehicles have a 12 Volt DC power source. A suitable linear actuator is manufactured by Thomson Saginaw Company of Saginaw, Mich. under the name PPA linear actuator.

Foot member 34 is fixedly secured to a second vertex of triangular linkage 58. A bearing surface 70 on foot member 34 contacts the accelerator pedal. Bearing surface 70 preferably is a separate arcuately extending piece slidably connected to foot member 34. The slidable connection is preferably achieved through a low friction method of attachment such as ball bearings 73 or teflon.

A force transducer 72 is mounted between the triangular linkage 58 and foot member 34 and is used to measure the force applied to the accelerator pedal. Force transducer 72 is a standard load cell having a range of 0–75 pounds which is greater than the typical force needed to move an accelerator pedal.

The third vertex of triangular linkage 58 is pivotally connected to a heel plate 76. Heel plate 76 is pivotally secured in relation to the floor of the automobile during testing. When linear actuator 36 cause a rotation of triangular linkage 58 with respect to calf member 30, foot member 34 causes accelerator pedal to depress or release depending if the actuator is extending or contracting. When actuator 36 extends, the accelerator pedal is moved away from the accelerator pedal. Heel plate 76 is weighted sufficiently to keep it in a fixed position during testing or is mounted to the floor to prevent movement. Heel plate 76 is preferably formed of two pieces that allows the rotatable connection to be adjusted in relation to the accelerator pedal before testing. Because foot member 34 is fixedly attached to triangular linkage 58, the angle between heel plate 76 and triangular linkage 58 and the angle through which foot member 34 moves directly corresponds. Consequently, a rotary foot angle transducer 74 is placed at the rotatable connection between heel plate 76 and foot member 34 to measure the angle subtended by the foot member 34. Foot angle transducer 74 is preferably of the same type as hip transducer 50 discussed above.

In operation, to ensure repeatable results in testing, a few preliminary conditions on the automobile must be checked before the installation of test fixture 10. One such preliminary check is inspecting the installation of the carpeting over the floor and removing any floor mats if the vehicle is so equipped. Wrinkled carpeting may cause errors and inhibit repeatability. The seat should also be adjusted to a known position before testing. The accelerator pedal should preliminarily be operated to check operability.

Test fixture 10 is then installed in seat 12. The centers of seat back plate 38 and seat base plate 48 are aligned with the centerline of the seat. Restraint in the seat is improved by installing the seat belt across test fixture 10. The calf and thigh lengths are adjusted to desired lengths. Weights are added to weight hangers 42 to simulate the weight distribution of a human subject. The position of test fixture 10 in seat 12 is similar to that of a human subject.

Once data is obtained from the various transducers, useful data can be compiled. Some useful data includes movement of particular members with respect to the "H-point." One useful example of a useful calculation is pedal effort versus foot travel which is derived from the ankle torque and ankle angle data.

What is claimed is:

1. An apparatus for measuring the performance of an accelerator pedal of an automotive vehicle having a floor and seat, the seat including a seat back and seat base, the apparatus comprising:

a torso member positioned against the seat back;

an elongated femur member having a first end and a second end, said femur member having at least a portion thereof positioned against said seat base;

a first pivotal joint connecting said first end of said femur member to said torso member, said joint pivoting about an axis positioned laterally to said torso member and said femur member so that the second end of said femur member pivots around said axis, said first pivotal joint forming a reference point having fixed location with respect to said seat base and said seat back despite movement of said femur member;

an elongated calf member having a first end and a second end;

a second pivotal joint pivotally coupling said first end of said calf member to said second end of said femur member;

a foot member;

a connection means for operatively coupling said foot member and said calf member, said connection means having a portion having a fixed position relative to the floor;

a linear actuator coupled between said calf member and said connection means for moving said connection means with respect to said calf member; and said foot member fixedly coupled to said connection means having a bearing surface for contacting the accelerator pedals.

2. An apparatus as claimed in claim 1 wherein said second joint pivots about a second axis parallel to said first axis.

3. An apparatus as claimed in claim 1 wherein said connection means comprises a triangular plate having a first vertex fixedly attached relative to said floor of the automotive vehicle, second vertex rotatably attached to said calf member, third vertex fixedly attached to said foot member.

4. An apparatus as claimed in claim 1 further comprising a base plate, said base plate having a fixed location relative to said floor of said automotive vehicle, said connection means rotatably attached to said base plate.

5. An apparatus for measuring the performance of an accelerator pedal of an automotive vehicle having a floor and seat, the seat including a seat back and seat base, the apparatus comprising:

a torso member positioned against the seat back;

an elongated femur member having a first end and a second end, said femur member having at least a portion thereof positioned against said seat base;

a first pivotal joint connecting said first end of said femur member to said torso member, said joint pivoting about an axis positioned laterally to said torso member and said femur member so that the second end of said femur-member pivots around said axis, said first pivotal joint forming a reference point having fixed location with respect to said seat base and said seat back despite movement of said femur member;

a first rotary transducer coupled to said first pivotal joint for measuring an angle between said torso member and said femur member;

an elongated calf member having a first end and a second end;

a second pivotal joint pivotally coupling said first end of said calf member to said second end of said femur member;

a second rotary transducer coupled to said second pivotal joint for measuring said angle between said femur member and said calf member;

a foot member;

a connection means for operatively coupling said foot member and said calf member, said connection means having a portion having a fixed position relative to the floor;

a linear actuator coupled between said calf member and said connection means for moving said connection means with respect to said calf member; a third pivotal joint connecting said connection means to said calf member a third rotary transducer coupled to said third pivotal joint for measuring said angle between said calf member and said connection means;

a torque transducer coupled to said third rotatable joint for measuring said torque between said calf member and said connection means;

said foot member fixedly coupled to said connection means having a bearing surface for contacting the accelerator pedal; and load transducer coupled to said foot member for measuring said force between said foot member and the accelerator pedal.

6. An apparatus as claimed in claim 5 wherein said second joint pivots about a second axis parallel to said first axis.

7. An apparatus as claimed in claim 5 further comprising a bearing surface having a slidable connection to said foot member for contacting the accelerator pedal.

8. An apparatus as claimed in claim 7 wherein said slidable connection is comprised of teflon.

9. An apparatus as claimed in claim 7 further comprising linear potentiometer connected to said connection means and said sliding plate for measuring pedal scrub.

10. An apparatus as claimed in claim 5 wherein said connection means comprises a triangular plate having a first vertex fixedly attached relative to said floor of the automotive vehicle, second vertex rotatably attached to said calf member, third vertex fixedly attached to said foot member.

11. An apparatus as claimed in claim 5 further comprising a base plate, said base plate having a fixed location relative to said floor of said automotive vehicle, said connection means rotatably attached to said base plate.

12. An apparatus as claimed in claim 5 wherein said torso member further comprising weight hangers.

13. An apparatus as claimed in claim 5 wherein said femur member comprising means for adjusting the length of said femur member.

14. An apparatus as claimed in claim 5 wherein said calf member comprising means for adjusting the length of said calf member.

15. An apparatus as claimed in claim 5 wherein said seat further comprises a seat belt, said seat belt urging said torso member to said seat back.

16. Art apparatus as claimed in claim 5, further comprising a plurality of protractors, one protractor coupled to said first rotatable joint, said second rotatable joint, and said third rotatable joint.

17. An apparatus for measuring the performance of an accelerators pedal of an automotive vehicle having a floor and seat, the seat including a seat back and seat base, the apparatus comprising:

a back plate positioned against the seat back;

a torso member rigidly attached to said back plate;

a seat plate positioned against said seat base;

an elongated femur member having a first end and a second end, said femur member having at least a portion thereof positioned against said seat base;

a firsts pivotal joint connecting said first end of said femur member to said torso member, said joint pivoting about an axis positioned laterally to said torso member and said femur member so that the second end of said femur member pivots around said axis, said first pivotal joint forming a reference point having fixed location with respect to said seat base and said seat back despite movement of said femur member;

a first rotary transducer coupled to said first pivotal joint for measuring an angle between said torso member and said femur member;

an elongated calf member having a first end and a second end;

a second pivotal joint pivotally coupling said first end of said calf member to said second end of said femur member;

a second rotary transducer coupled to said second pivotal joint for measuring said angle between said femur member and said calf member, a third pivotal joint connecting said connection means to said calf member;

a foot member;

a connection means for operatively coupling said foot member and said calf member, said connection means having a portion having a fixed position relative to the floor;

a linear actuator coupled between said calf member and said connection means for moving said connection means with respect to said calf member;

a third rotary transducer coupled to said third pivotal joint for measuring said angle between said calf member and said connection means;

a torque transducer coupled to said third rotatable joint for measuring said torque between said calf member and said connection means;

said foot member fixedly coupled to said connection means having a bearing surface for contacting the accelerator pedal; and load transducer coupled to said foot member for measuring said force between said foot member and the accelerator pedal, 18. An apparatus as claimed in claim 17 wherein said seat plate having a first pair of weight mounts.

19. An apparatus as claimed in claim 18 further comprising a second pair of weight mount connected to said first rotatable joint.

* * * * *